Aug. 2, 1949.    F. W. SCHWINN    2,477,833
STRUCTURE AND MANNER OF PRODUCING WHEEL RIMS
Filed Oct. 5, 1946
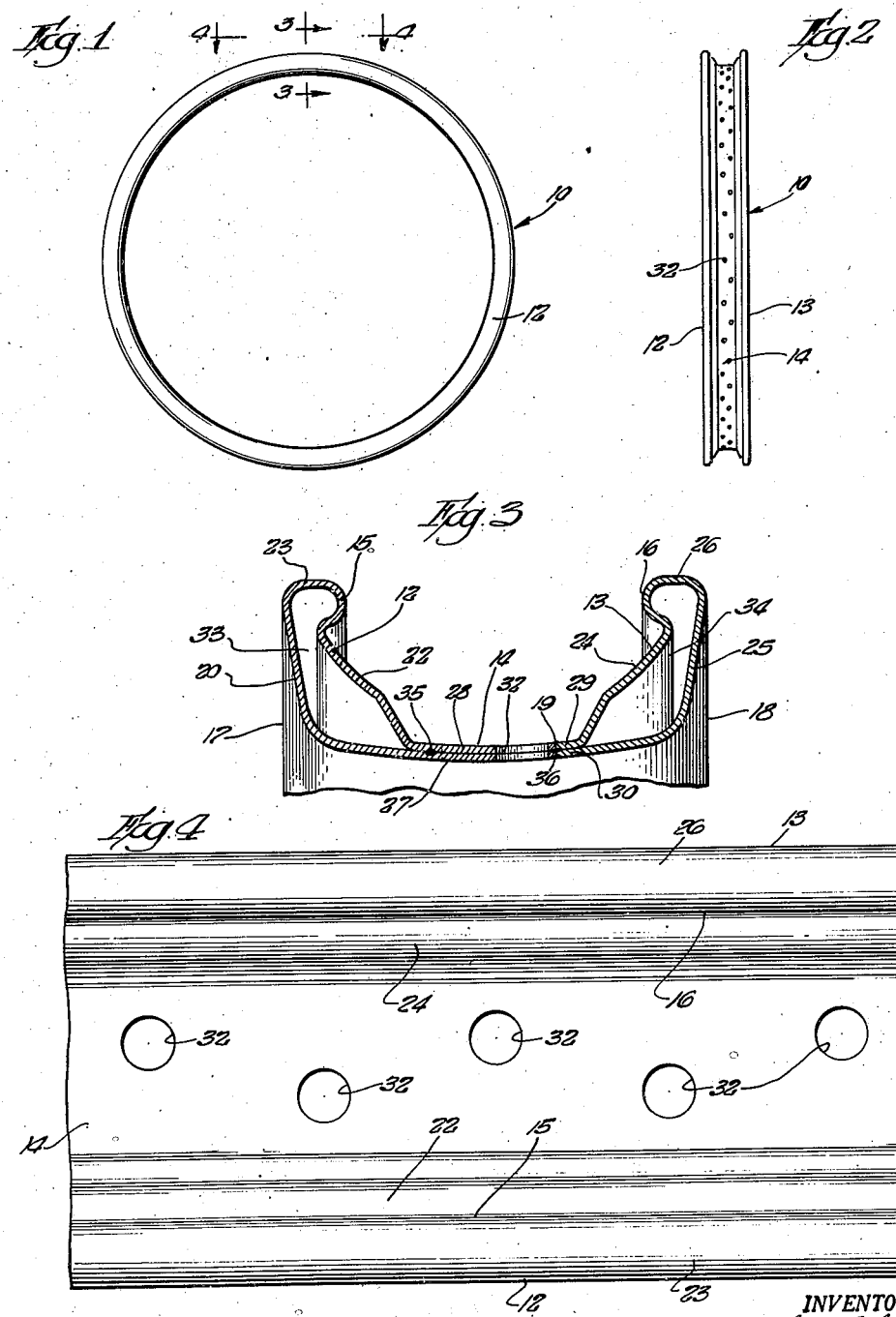
INVENTOR.
Frank W. Schwinn
BY
Albert C. McCaleb
Atty.

Patented Aug. 2, 1949

2,477,833

UNITED STATES PATENT OFFICE 2,477,833

STRUCTURE AND MANNER OF PRODUCING WHEEL RIMS

Frank W. Schwinn, Chicago, Ill.

Application October 5, 1946, Serial No. 701,433

8 Claims. (Cl. 301—97)

This invention relates to the structure and manner of producing wheel rims made of formed sheet metal and of the type adapted to use on bicycle wheels and the like.

Wheel rims somewhat similar to that disclosed herein have previously been made of sheet metal. However, all known ones of the previous formed sheet metal rims and the processes of producing them in quantities have given costly manufacturing problems and difficulties. One such manufacturing difficulty has arisen in the plating of known rim structures. A plurality of plating operations in different solutions is generally necessary. Furthermore, the provision of necessary spoke holes in the rim has permitted access of the plating solutions to the interior of hollow rim portions from which it cannot be readily removed. The result has been that the delicate plating solutions successively used on the rims have undesirably contaminated one another.

With the solution of such problems in mind, it is a general object of my instant invention to provide a wheel rim structure and a process of producing same from sheet metal, which structure and process are suited to economical quantity production by steps including that of plating.

Other objects and advantages of the invention will be apparent from the following description and the accompanying drawings in which similar characters of reference indicate similar parts throughout the several views.

In the one sheet of drawings,

Figs. 1 and 2 are, respectively, side and front elevational views of a wheel rim embodying a preferred form of my invention and made in accordance with my preferred process;

Fig. 3 is a fragmentary sectional view drawn to an enlarged scale and wherein the section is taken substantially on a line 3—3 of Fig. 1 and viewed in the direction indicated by the arrows; and Fig. 4 is a fragmentary elevational view drawn to an enlarged scale and viewed substantially as indicated by a line 4—4 in Fig. 1 and its accompanying arrows.

In the exemplary embodiment of my invention which is disclosed in the accompanying drawings for illustrative purposes, I have depicted a rim 10, such as that utilized for the wheels of bicycles and the like. In structure the rim comprises side flange portions 12 and 13 and a base portion 14 which together form a radially open tire-receiving channel extending circumferentially of the outer rim surface. On opposite sides of the rim and extending inwardly in opposed relationship at the outer edges of the flange portions 12 and 13, are rounded lobes 15 and 16 which serve to grip and retain the side surfaces of a tire.

In accordance with my invention, I prefer to fabricate the rim from sheet metal. The resultant rim is not only light in weight but is strong and durable. In my preferred process of fabrication, the rim is initially formed in two circular sections 17 and 18 which are separated substantially at a line 19, as shown in Fig. 3.

In the rim disclosed, the side flange portions 12 and 13 are similar in contour, although oppositely disposed, in their assembled relationship. The side flange portion 12 has side walls 20 and 22 spaced relative to one another laterally of the rim section and joined at their outer edges by a connecting portion 23. Likewise, the side flange portion 13 has side walls 24 and 25 which are laterally separated and joined by an integral connecting portion 26. The base portion of each rim section is provided by marginal extensions of the flange side walls disposed in face-to-face relationship. By preference, the base portion of one of the rim sections is laterally wider than that of the other. Thus, as shown in Fig. 3, marginal extensions 27 and 28 of the flange side walls 20 and 22 are disposed in face-to-face relationship and terminate with their edges substantially flush. Marginal extensions 29 and 30 on the side walls 24 and 25, respectively, are similarly disposed in face-to-face relationship and terminate with their edges flush, but they are considerably narrower than the marginal extensions 27 and 28 so that the dividing line between the rim section is off of the center plane of the rim and near the side flange portion 13.

By thus dividing the rim sections, space is provided for series of circumferentially spaced spoke-receiving holes 32 in the marginal extension which comprises the base portion of one of the rim sections. In the usual manner, the spoke-receiving holes 32 are alternately staggered on opposite sides of the center plane of the rim.

Metal rims, such as the one disclosed herein, are suited to outside finishing which includes electroplating. In this process best results require successive plating steps in different plating solutions. In order to prevent plating solutions from getting into the hollow cavities 33 and 34 within the side flange portions 12 and 13 of the rim sections by seepage through the spoke-receiving holes and between the sheet metal layers and thus being transferred from one plating solution to another, those hollow cavities are sealed circumferentially of the rim by welded seams. In my disclosed structure, the sealing of the flange cavities and the securing of the rim sections together are accomplished by two welded seams. One such welded seam 35 extends circumferentially of the rim intermediate the spoke-receiving holes 32 and the side flange portion 12. The other welded seam 36 buttwelds the opposed edges of the marginal extensions together and at the same time forms a seal for the hollow cavity 34.

From the foregoing description of the structure and process of fabricating my wheel rim, it may be readily understood that a strong and durable rim is provided wherein the steps of fabrication and welding may be readily accomplished in production quantities and at reasonable cost. Since the two welded seams, at least one of which is utilized to secure the rim sections together, seal the hollow cavities within the side flange portions of the rim, no plating solution can get into the interior or in any inaccessible part of the rim so as to lead to contamination of the plating solutions used for finishing the rim.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A wheel rim structure adapted to manufacture from formed sheet metal and comprising, in combination, two circular sheet metal rim sections each having side flange and base portions formed by an integral loop of sheet metal doubled back upon itself transversely of the loop with the edges thereof adjacent and substantially coplanar, said side flange portion of each rim section having side walls spaced laterally of the loop with a hollow cavity therebetween which extends circumferentially around the rim section, the base portions including inner margins composed of two thicknesses of the sheet metal in face-to-face relationship, the inner margin of one of the rim sections being laterally wider than that of the other and having therein series of circumferentially spaced radial spoke-receiving holes in lateral staggered relationship relative to a central plane of the rim, the wider of said inner margins having a welded seam extending the full circumference of the rim between said spoke-receiving holes and said hollow cavity so as to seal the hollow cavity thereof, and said edges of the rim sections being buttwelded together so as to form a seam circumferentially of the rim which seals the other of said hollow cavities.

2. A metal wheel rim structure comprising, in combination, a pair of circular sheet metal rim sections each having integral side flange and base portions which, when axially aligned in opposed and abutting relationship, form a channel-like rim with a sectional shape substantially symmetrical with respect to a central plane, said side flange portion of each rim section having side walls of predetermined contour and spaced apart and joined by a connecting portion to define a hollow cavity therebetween which extends circumferentially around the rim section, said base portions being marginal extensions of said side walls disposed in face-to-face relationship with their edges substantially coplanar, the base portion of one of the rim sections being laterally wider than that of the other and having therein circumferentially spaced spoke-receiving holes, the wider of said base portions having a welded seam extending the full circumference of the rim between said spoke-receiving holes and said hollow cavity so as to seal the hollow cavity thereof, and said edges of the base portions being buttwelded together so as to form a seam circumferentially of the rim which seals the other of said hollow cavities.

3. A metal wheel rim structure comprising, in combination, two circular rim sections each having integral side flange and base portions which together define a radially open tire-receiving channel, said side flange portion of each rim section having side walls spaced apart with a hollow cavity therebetween and extending circumferentially around the rim section, said base portions being marginal extensions of said side walls and engaging in face-to-face relationship, the base portion of one of the rim sections being laterally wider than that of the other and having therein circumferentially spaced spoke-receiving holes, the wider of said base portions having a welded seam extending the full circumference of the rim intermediate said spoke-receiving holes and said hollow cavity so as to seal the hollow cavity thereof, and said base portions of the rim sections being welded together so as to form a seam circumferentially of the rim which seals the other of said hollow cavities.

4. A metal wheel rim structure comprising, in combination, two circular rim sections each having integral side flange and base portions which together define a radially open tire-receiving channel, said side flange portion of each rim section having side walls spaced apart with a hollow cavity therebetween which extends circumferentially around the rim section, said base portions being marginal extensions of said side walls, the base portion of at least one of the rim sections having therein a series of circumferentially spaced spoke-receiving holes, said marginal portions being secured together by welded seams extending the full circumference of the rim intermediate said spoke-receiving holes and said hollow cavities so as separately to seal said hollow cavities, and one of said welded seams being utilized for securing the base portions of the rim sections together.

5. In a metal wheel rim structure, the combination comprising a circular rim section having integral side flange and base portions, said side flange portion having side walls of predetermined contour spaced apart and joined by a connecting portion to define a hollow cavity therebetween which extends circumferentially around the rim section, said base portion comprising marginal extensions of the side walls overlying one another and having circumferentially spaced spoke-receiving holes therein, and a welded seam extending around the base portion intermediate the spoke-receiving holes and the side flange portion to secure said marginal extensions together and seal said hollow cavity.

6. The process of making wheel rims from sheet metal which comprises the steps of forming the sheet metal into two complementary and circular rim sections each having a lateral section composed of a side flange loop and a base portion, providing a series of circumferentially spaced spoke-receiving holes in the base portion of one of the rim sections, welding a seam circumferentially of the base portion of the last mentioned rim section between said holes and the flange loop thereof to seal the flange loop, and welding the rim sections together by a circumferential seam which seals the other flange loop.

7. The process of making wheel rims as defined in claim 6, and wherein each rim section is formed by return bending the sheet metal upon itself laterally of the section and to an extent such that the edges are adjacent and substantially flush, and shaping the metal defining the side flange loop of each rim section to provide a predetermined sectional contour.

8. In the process of making wheel rims from sheet metal, the steps comprising forming the sheet metal into a circular rim section having a lateral sectional shape composed of a side flange loop and a base portion, punching a series of circumferentially spaced spoke-receiving holes in the base portion, and welding a continuous seam circumferentially of the base portion between said holes and the flange loop to seal the flange loop.

FRANK W. SCHWINN.

REFERENCES CITED

The following references are of record in the file of this patent:

UNITED STATES PATENTS

| Number | Name | Date |
| --- | --- | --- |
| 1,649,922 | Paull | Nov. 22, 1927 |
| 1,912,594 | Sauzedde | June 6, 1933 |
| 2,126,222 | Schwinn | Aug. 9, 1938 |
| 2,126,223 | Schwinn | Aug. 9, 1938 |

FOREIGN PATENTS

| Number | Country | Date |
| --- | --- | --- |
| 182,604 | Great Britain | July 13, 1922 |
| 821,236 | France | Aug. 17, 1937 |